United States Patent Office 2,992,605
Patented July 18, 1961

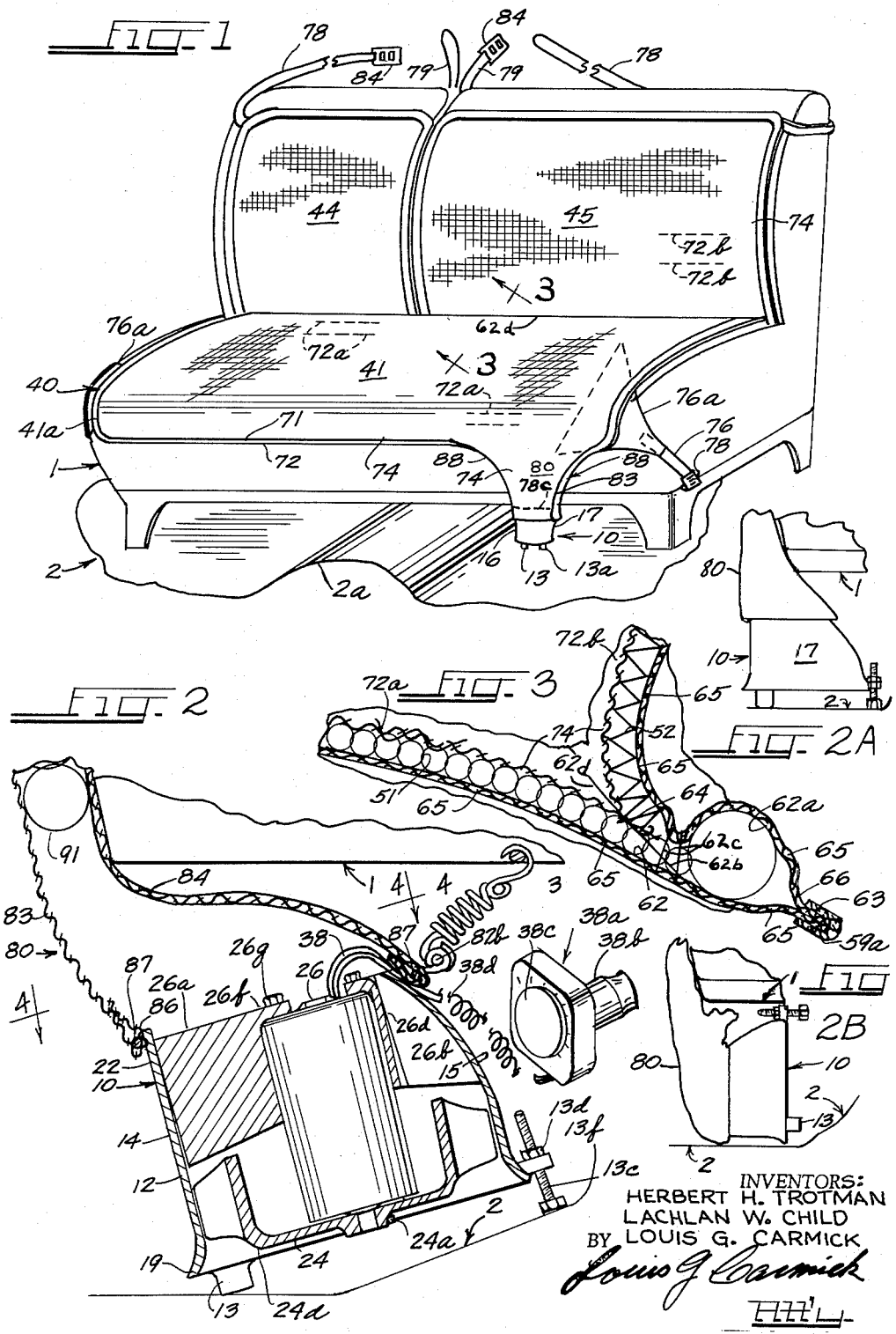
July 18, 1961 — H. H. TROTMAN ET AL — 2,992,605
APPLIANCE FOR FORCING AIR CIRCULATION UNDER SUPPORTED BODIES
Filed June 16, 1958 — 4 Sheets-Sheet 1
INVENTORS:
HERBERT H. TROTMAN
LACHLAN W. CHILD
BY LOUIS G. CARMICK

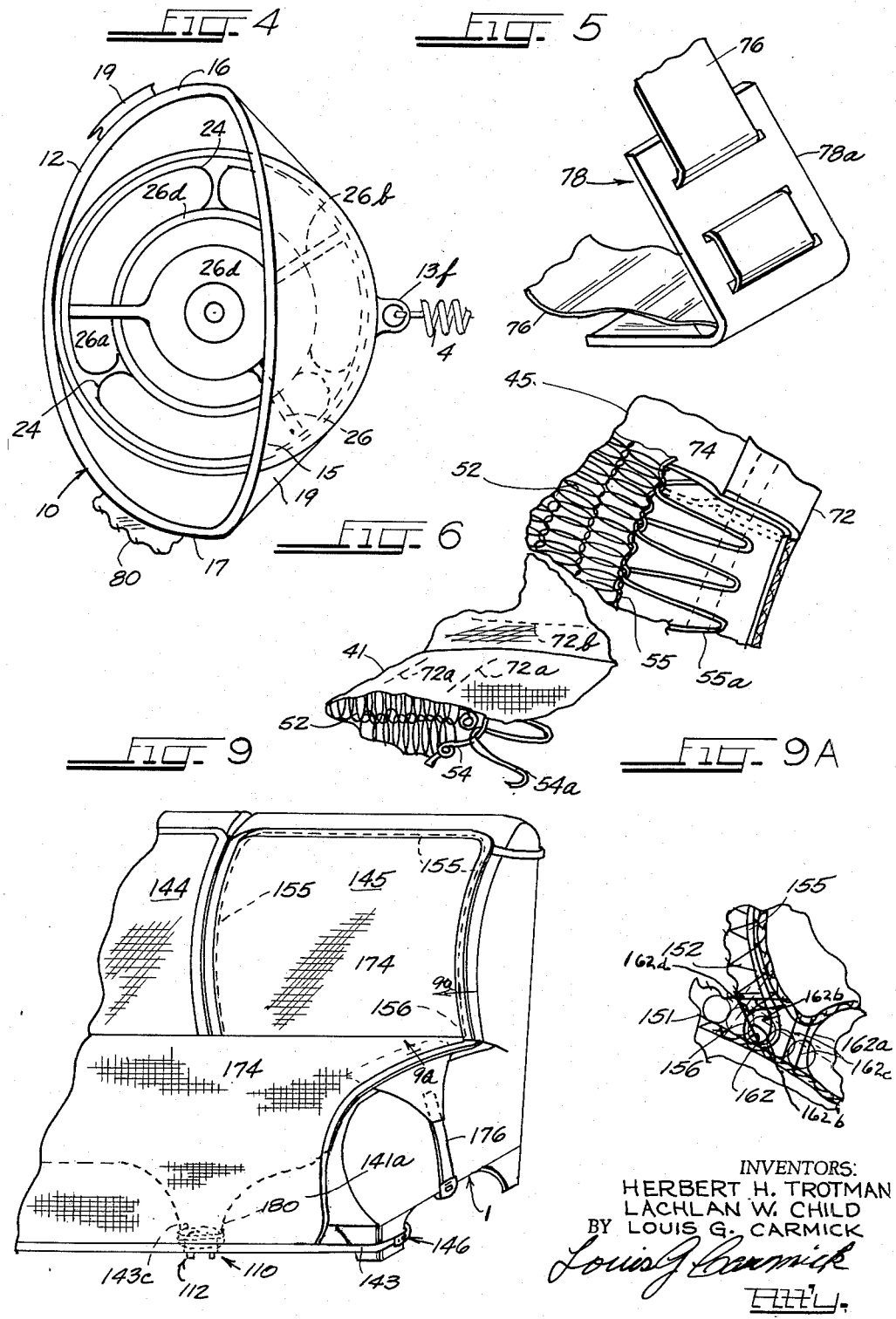

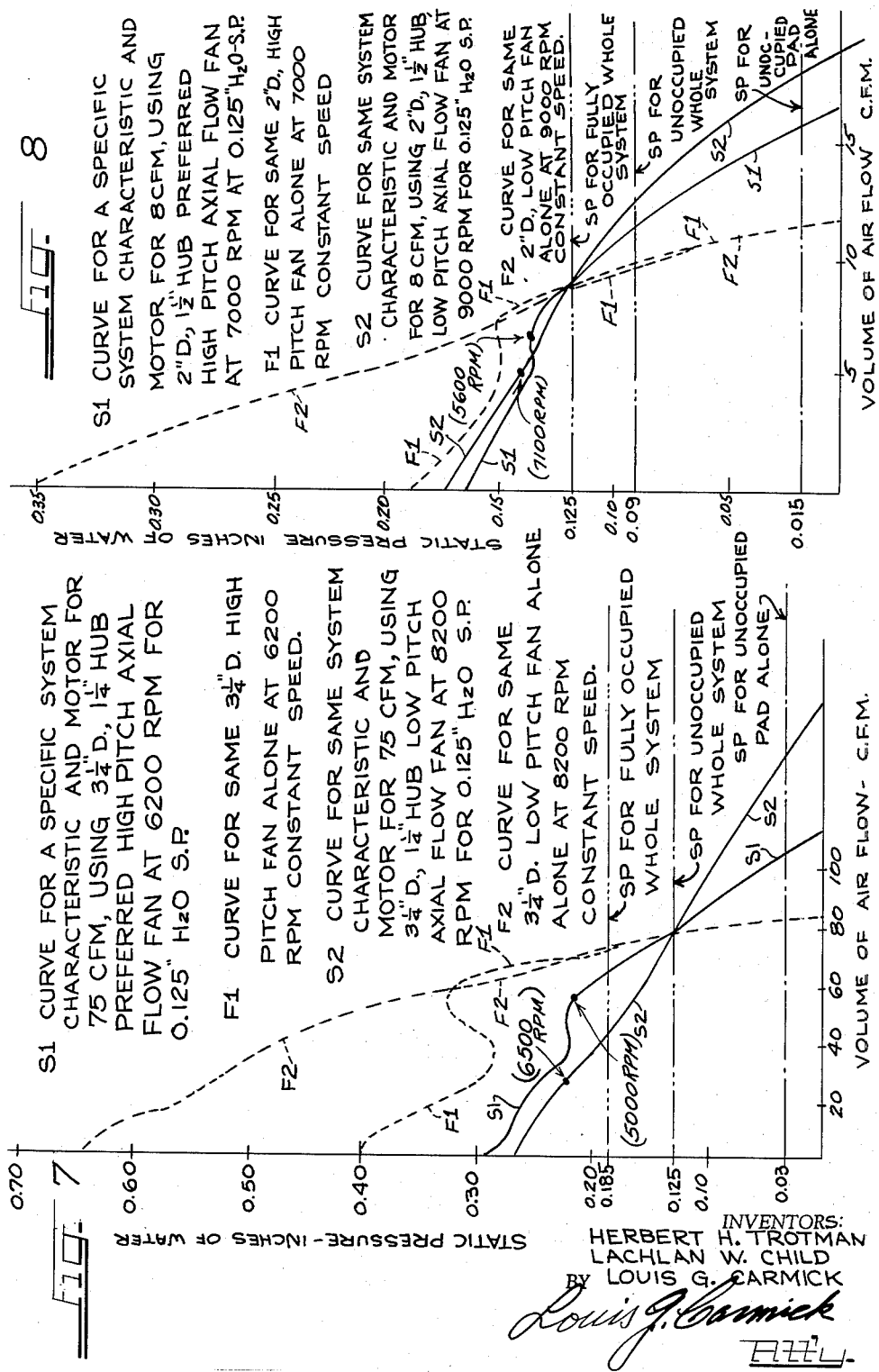

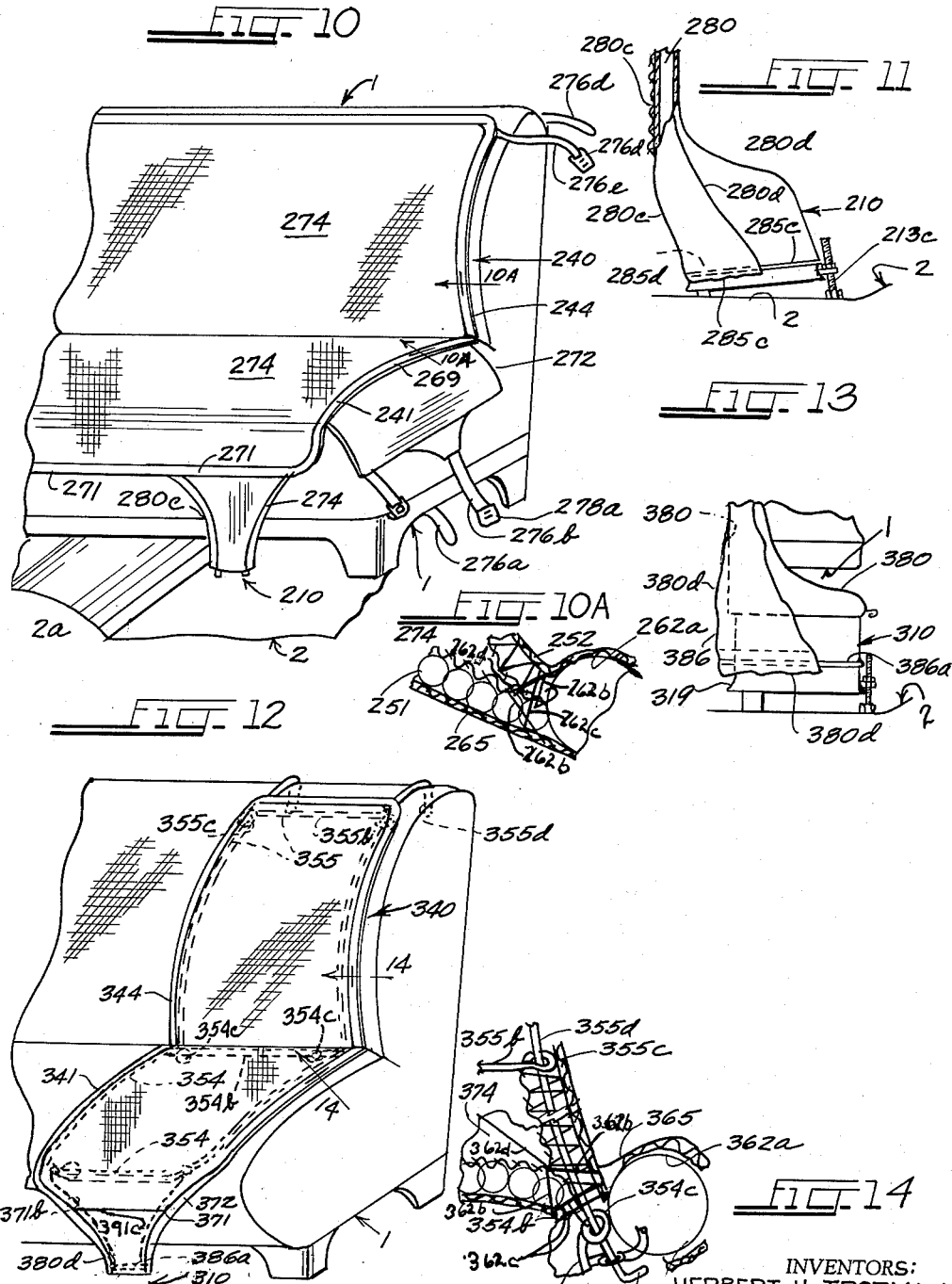

2,992,605
APPLIANCE FOR FORCING AIR CIRCULATION UNDER SUPPORTED BODIES
Herbert H. Trotman, Churchland, Va., Lachlan W. Child, Detroit, Mich., and Louis G. Carmick, Chicago, Ill.; said Child and said Carmick assignors to said Trotman
Filed June 16, 1958, Ser. No. 742,428
20 Claims. (Cl. 98—2)

This invention relates broadly to improved means for supplying forced ventilating air flow under supported portions of a human body and, more specifically, to an improved form of appliance using a flexible air carrying and distributing pad with a porous upper surface having certain flexible duct connections to a blower unit, said pad being designed for use on cushioned surfaces, including automobile seats and backs.

This invention also relates in part to certain improvements over our co-pending U.S. patent application for "Forced Air Under Body Ventilating Device," filed June 9, 1958, Serial Number 740,884, which (with its full disclosures) is intended to be included herein by this reference. Not all of the teachings as claimed in this application need come under the disclosures or claims of our co-pending application.

In general, the objects of this invention include all of the several objects of our said co-pending application to which reference is made.

Additional and more specific objects of this invention are to provide:

Certain improved proportions and relationships for the forced air supplying blower and its related air flow system to reduce costs and sizes, noise level, and automobile battery current consumption, and to permit a more compact installation having less interference with the driver or passengers.

A thinner and more flexible air distributing pad which is of lower cost, changes the cushion shape less, has the required low restriction to air flow, and permits certain better pad arrangements.

Certain improved arrangements and constructions for the flexible duct supplying forced air from the blower to the said pad.

Improved arrangements for the motor, blower, and their casing to better cooperate with conventional seat and cushion shapes.

Further and more detailed objects or advantages of this invention are set forth in, or will be apparent from, the attached specification, drawings, and claims.

In the attached drawings:

FIGURE 1 is a perspective view with surface portions broken away to illustrate under structure, and showing a first embodiment of this invention in use on the front seat of a conventional passenger automobile.

FIGURE 2 is a partial and enlarged vertical section taken from front to rear through the central portion of the blower unit in the lower portion of FIGURE 1.

FIGURE 2A is a reduced size end view generally like FIGURE 2, showing the blower unit in a different adjusted or vertical position and applied to a rear seat.

FIGURE 2B is a reduced size end view generally like FIGURE 2, showing the blower unit in a horizontal position.

FIGURE 3 is a partial and enlarged vertical section taken on the line 3—3 of FIGURE 1.

FIGURE 4 is a section taken on the line 4—4 of FIGURE 2.

FIGURE 5 is an enlarged perspective view, showing the strap and hook member at the right side of FIGURE 1.

FIGURE 6 is a partial, enlarged perspective view, with surface portions broken away, showing the seat mat to back mat connection and edge seams at the right side of FIGURE 1.

FIGURE 7 shows curves of static pressure and efficiency versus air flow volume which are typcial for efficient and larger capacity propeller type fans and for complete systems according to this invention.

FIGURE 8 shows curves like those of FIGURE 7, but for smaller volumes of air flow.

FIGURE 9 is a partial perspective view generally like FIGURE 1, but relating to a second form of this invention.

FIGURE 9A is an enlarged sectional view taken on the line 9A—9A of FIGURE 9, being partly in perspective with surface portions broken away.

FIGURE 10 is a partial perspective view generally like FIGURE 1, but relating to a third form of this invention.

FIGURE 10A is an enlarged vertical section taken on the line 10A—10A of FIGURE 10.

FIGURE 11 is a partial and enlarged side view of the blower unit in the lower portion of FIGURE 10, with its upper portion in section.

FIGURE 12 is a partial perspective view generally like FIGURE 1, but relating to a fourth form of this invention.

FIGURE 13 is a partial and enlarged side view of the blower unit in the lower portion of FIGURE 12.

FIGURE 14 is a sectional and broken away perspective view taken on the line 14—14 of FIGURE 12, and with structural portions shown as partly separated or opened out to show their connections.

In the first illustrated form of FIGURES 1 to 6, the body ventilating appliance of this invention is shown in use on the three-passenger front seat 1 of a conventional full size and recent U.S. passenger automobile having a floor 2 and the usual central transmission hump 2a in the floor. In this particular case, the seat is shown as being of the divided, swingable-back type for a two-door sedan or the like, with the division between the two parts of the split back being to one side of center to match certain makes of cars. It will be understood that the split back may be centrally positioned, as shown in the other forms herein.

The appliance is here illustrated in a specific form intended for use, and for easy customer installation, on the front or rear seat of almost any large production type of recent U.S. automobile. As shown, the appliance includes the forced air supplying or motor-blower unit 10, the air distributing seat and back covering pads designated as a whole by 40, and the flexible, forced air supplying duct or connecting conduit portion 80.

Many of the structural arrangements, features, and theories used herein are disclosed and claimed in our above-identified co-pending application. For convenience in comparison of these two cases, similar characters are used for similar or related parts here. It is intended that structural features from the previous application are to be used where details or features are not described in detail here.

As will be apparent from the following disclosure, the several forms of this invention embody material improvements over the disclosure of our said co-pending application. Frst, with respect to the forced air supplying means or the blower unit 10 and its parts, it will be noted that these differences include, among other features, the following:

(1) A much smaller, simpler, and lower cost motor-blower unit using more efficient and smaller types of motors and blowers, according to the teachings of this invention as set forth in the latter part of this specification.

(2) A differently shaped casing, which can be entirely or partially positioned under the front portion of almost all automobile seats.

(3) A casing (with its connections) so arranged that it may be used tilted to any of various selected and adjusted angles, or in vertical, upright position, or even horizontally.

(4) A casing having its air discharge portion extending across its front and wider than the casing base. Alternatively, the casing may be of simple upright but cylindrical form.

(5) A simplified arrangement to provide for different heights of seats by a telescopic or overlapping adjustment of the lower end of the tapered, flexible duct down over substantially the entire height of the blower casing.

Other improved features will be apparent from the following more detailed description of the several forms.

The motor-blower unit 10, as also shown in more detail in FIGURE 2, comprises a generally upright outer casing 12 shaped approximately as shown, with a two-way taper. That is to say, its width increases from its open and slightly flared-out base 19 up to its upper and wide discharge portion 22, while its front-to-back thickness decreases. Thus an adequate internal cross section is provided for the air flow.

The generally upright front wall 14 merges into the upright front of the wide discharge portion 22. Similarly, the sloped side walls 16 and 17 continue up to form the side walls of discharge portion 22. The periphery around this upright casing remains substantially constant (except for the base flare-out 19), like a short cylinder whose upper portion is somewhat flattened. This, in fact, may be essentially one method of forming it.

This casing may be made in various ways, but it is preferred that it be pattern-formed (that is, molded, cast, or the like) to give an attractive, smooth, rounded-corner shape of the type shown. While a one-piece metal unit may be employed, a molded plastic or laminate material is preferred. The plastic requires no painting and has a desirable vibration absorption for the motor and air flow. It is silent in use and more agreeable for body contact. The entire casing 12 may be one piece of plastic shaped by suitable female dies or molds from a preformed hollow cylinder in which the flared-out base 19 may be formed initially or subsequently.

As shown by the scale of FIGURE 2, the under front surface of the front wall is four inches from the car floor 2, the motor is approximately two inches long, and the fan 24 is about two and three-quarters inches in diameter. Exclusive of its short legs, the casing may have a height of only a little over two and one-quarter inches along its motor axis. These dimensions are given by way of example to show how compact the present unit may be, if made according to these disclosures and using the fan and system design features set forth in the latter part of this specification.

The small motor 26 (whose diameter may be as small as one inch, as shown here) is suitably held in place in casing 12 as by the spider or holding member 26d which is preferably of molded plastic and includes the integral and generally radially extending vanes 26a, 26b, and 26c which are shaped to neatly fit and be secured inside the casing. They may be inserted from the base end. The vanes extend out from the motor-fitting cylindrical or cap-shaped member 26d (which is preferably of tapering cross section towards the discharge end for better air flow conditions). The upper end of 26d may be cup-like or completely closed over the upper end of the motor or may have an inwardly extending ring portion 26f engaging over the upper end of the motor, which is thus held by a friction fit.

The motor-holding vanes may advantageously be shaped to straighten out or remove the swirl from the fan delivery air, thus raising the efficiency. To this end, the molded vanes are air foil shaped in cross section and twisted like fan blades to give a reverse rotation to the air flow, as will be apparent to those skilled in fan design.

The slightly enlarged (and here tilted) flat base 19 is open for insertion of the upper small D.C. electric motor 26 (together with its spider 26d) carrying the lower small propeller type fan 24, which latter is secured as usual on the shaft of the motor as by set screw 24a.

The lower and generally flared-out cylindrical front edge of the base 19 may be supported directly on the car floor, especially when the casing 12 is tilted as shown in FIGURE 2. However, to give additional room for air entry, to provide for the base being horizontal when that is required, as shown in FIGURE 2A, and to permit the use of only one adjustable leg, we prefer to have the two spaced-apart front legs 13 and 13a integral with the lower casing portion 19. Any suitable type of adjustable height rear supports or legs may be employed. Here a single screw leg 13c is shown, held in selected position by lock nut 13d in a threaded hole on the suitably thickened base portion 13f. As shown, the screw leg 13c extends up along and outside of the back of the casing.

The support 13f for the adjustable height rear leg is shown as being integral with the base 19. The screw and nut adjustable length rear leg 13c, thread determines the tilt angle of the casing 12 and may be adjusted to a selected position (in which it is held by lock nut 13d) for any particular automobile. As shown, bolt 13c goes through a threaded hole in outwardly extending, integral boss 13f and may extend up along the back of the casing.

As indicated in FIGURES 2, 2A, and 2B, the casing 12 may be used in various adjusted tilted positions, vertically (as shown in FIGURE 2A, certain rear seats do not have much or any open space under their fronts), or even horizontally, as shown in FIGURE 2B. This horizontal position illustrates the adaptability of this unit and its connecting duct.

Referring again to FIGURE 2, it will be apparent that any unwanted length of duct 80 (as in the case of a very low seat) may be taken up by shoving unit 12 further in under the front seat (the underseat space permitting).

As shown, a better air entrance condition is obtained by the smoothly converging entrance given by the flared-out base 19 and the curve or fillet at the corner 24c of the fan blade holding cup 24b. The fan design features are described in the section on Operation, etc.

The wall 15 may, if desired, have downwardly directed serrations or be roughened throughout its height to give a better surface to be engaged by the clamped portion on the lower end 85 of the duct 80.

The motor current supply wires 38 (here two, including a ground wire for the plastic encased and thus insulated motor) may be led out through a suitable hole in the back of casing 12, or, as shown, out of the open top and down under the lower end 85 of the flexible duct 80. A motor switch and control unit is provided in the supply wire. As disclosed in our above-mentioned application, it may preferably include on and off and multi-speed controls, with at least one lower speed which is about one-third of the top speed and the corresponding maximum air flow rate. This control 38a may be conveniently positioned as desired, including locating it on the plug 38b to go into the cigar lighter.

The casing may be held in position in under the edge of the front seat by suitable means such as the sharp steel hook 3 carried by tight, short, coil spring 4, which is in turn secured to the casing by having its looped inner end around the adjusting bolt 87b for the clamp 87. This hook may be engaged up through the seat bottom as shown.

The forced air carrying and distributing pad (indicated as a whole by 40) includes the one continuous seat portion 41 (which is flexible and foldable at its middle or elsewhere), and has the two swingably-attached (in such a way as to also permit air flow thereto) back mat portions 44 and 45 and the flexible and integral extension or flexible air supply duct 80.

These seat and back portion pads form plenum-like air distributing passages, whose substantially open or unobstructed interior thickness is defined and maintained by a flexible but non-collapsible layer of fine springy wires, and which in my preferred embodiment are the side-by-side and suitably connected (as by being interwoven or interthreaded) horizontally extending, spring steel wire coil springs 51 forming the open center body or air passage for the seat portion 41 and the similarly interconnected coil springs 52 forming the open center body for the two back pad portions 44 and 45.

The various arrangements of springs such as 51 and 52 may be employed (of which some others are illustrated in other modifications herein), in this first modification we prefer to have the springs 51 and 52 disposed at right angles, with the back portion's springs 52 extending up and down for somewhat more flexibility or easier bending around the upright sides of the seated person's back. These inter-connected spring bodies hinge on each other for somewhat easier bending or flexing of the layer in this direction, that is, along lines parallel to the spring lengths. For flexing in the other direction, each individual coil spring is bent. For the seat portion 41, we here prefer the somewhat greater flexibility obtained by hinge action along lines parallel to the front edge of the seat for greater seating comfort in a multipassenger or bench type seat.

Such springs will not collapse appreciably or take any permanent set from any loads normally applied to these cushion pads, or even under a man standing on the pad on one foot. However, these pads are highly flexible and bend freely in any direction. Thus they readily conform to deflections in the supporting cushion seat or back beneath these pads, and retain substantially the seating comfort of the car's seat and back cushions. Also, they always maintain an almost constant open thickness to conduct and distribute the forced air. The cross-sectional area of the high strength fine wire of the springs is so small that the resulting restriction to the forced air flow is hardly measurable by ordinary methods. The springy steel in these horizontally extending coils is, as a practical matter, never stressed beyond, or even close to, its elastic limit, and fatigue is no problem here. Hence there is no permanent set causing sagging or partial collapse, such collapse or sagging being quite common in even the best grade of curled hair cushions or in various open forms of plastic or rubber. Also, for a given thickness of pad, hair, rubber, and plastic will obstruct the air flow much more than steel if used to form the open mats, since they are much weaker. They are therefore not only more costly, but much less desirable for present purposes.

It will be appreciated that a considerable number of various arrangements or forms of spring wire coils or other spring wire forms may be used within the broader purview of this invention.

The pad 40 as a whole, as shown in the several forms hereof, has a number of improvements over the disclosures of our said co-pending application. These improvements include:

(1) A thinner coil spring layer and hence a thinner, more flexible and lower cost pad which causes less change in the cushion shape or height.

(2) The elimination of wire frames about the individual mats, to provide more flexibility and comfort.

(3) The flexible uniting (or securing together as by sewing) of the inner spring mats and their flexible envelopes. This may include flexibly connecting the springs and the envelope edges or seams. It may also include connecting the springs and the top and bottom envelope surfaces. This produces a more durable and stronger unit.

(4) A more comfortable and attractive seat portion made in one continuous mat, with no central seam or hinge.

(5) The extension of the more flexible (and unframed) seat portion down over the nose or front edge of the cushion to thus supply body ventilating air in under the knees of passengers, and to give a more attractive appearance on a number of different sizes of seats.

(6) Strap means (connecting to or under the seat) to hold the front of said pad (including the above-mentioned front extension thereof) in tension over the rounded corner and across the length of the seat cushion.

(7) An improved, all flexible, rear spring hinge to carry air and be held between the meeting cushions of the seat and back portions.

(8) A flexible covering extending down from the front edge of the seat portion over the seat front and the blower unit, and including tensioning securing means therefor.

(9) Improved seat back engaging hooks combined with back mat frames and arranged to fold flat for packaging.

Other improved features will be apparent from the following more detailed description.

Referring to all of the species herein, we have discovered that the air carrying passage or plenum chamber of mat 40 may be adequately supplied by intermeshed coil springs 51 and 52, which are like the one-half inch ones disclosed in our said co-pending application but which are much thinner. In fact, it has been found that one-quarter inch diameter springs of this type (which will give a substantially open passage of one-quarter inch thickness) are better over-all, considering all factors such as cost, flexibility, increase of cushion height, etc.

It has been found that the increase in resistance of this thinner passage to even the maximum air flow rate of from 50 to 70 c.f.m. for a three-passenger seat (or from approximately 4 to 6 c.f.m. per square foot of unoccupied porous discharge area) is quite negligible. In fact, it is hardly measurable, being less than 0.01 inch of water pressure as compared to the perferred resistance of the pad (including its porous cover) of approximately 0.03 inch of water static pressure drop for the above-noted maximum air flow rate. Thus, the porous cover (in order to give a sufficiently even distribution) should supply most of the pad's resistance to air flow.

This thinner pad is more flexible, is of lower cost, and is more like a normal thin seat cover in that it does not change the cushion shape or materially increase its thickness.

The diameter or gauge of the spring wire itself for the smaller coil diameter of springs 51 and 52 may be materially smaller than the 0.030 inch wire diameter disclosed in the said co-pending application. This is due to the greater inherent rigidity of the much smaller coil size or diameter.

The springy or bendable wire frames to enclose and hold each spring pad section extended may be omitted, according to this invention. The interconnected spring mats may be used alone, or (as is preferred) these spring mats may be flexibly held extended by having all of their edges flexibly connected (as by fabric type means) into the edges of the pad envelope or cover. As shown here, the spring mat edges are flexibly secured to the seams (or other pad edges) as by having textile type cords (or even very thin and flexible wires) 54 and 55 threaded through the coils and held in looped over portions in the coil ends just as the springy wire frames are held in the said co-pending application. These cords 54 and 55 may be directly sewed or otherwise flexibly secured to all of the seams such as 66, 67, 68, and 69 and their tapes 72, or, preferably, extra cords such as 54a are secured into all of the seams and also intertwisted as shown with the first-mentioned cords 54 and 55.

Thus the mat bodies of interwoven coil springs (which would otherwise be collapsible transverse to the spring lengths) are held extended by these edge or seam connections and united with the flexible envelope. The upper porous cover 74, as well as the impervious under portion 65 of the envelope, may be flexibly connected to the spring mats as by suitable spaced-apart securing means such as the lengths of stitching dictated by 72a and 72b.

The uniting or flexible connection of the coil spring mats with their flexible covers gives a more durable, flexible structure, and prevents relative sliding of the covers on the springs for a better feel.

The single seat portion 41 is continuous from side to side of the seat portion, with no middle seam or special hinge. This gives better comfort and a better appearance. It is flexible enough for folding in packaging.

The seat portion 41 may be made deep or long enough from front to back to extend well down over the nose or rounded front edge of the seat cushion at 41a. The air discharging, porous upper cover 74 extends over this frontal portion to supply forced ventilating or cooling air under the knees (or even against the backs of the legs) of the driver and passengers. This front extension may be carried down as far as desired in various applications and for various other types of seats. The greater flexibility of the thinner and frameless seat mat 41 permits it to fit various cushion front shapes and curves neatly and with a well-tailored appearance.

This more flexible seat and back mat is held against shifting on the cushions by providing an air impervious undercoating having an anti-slip action or high friction against the upholstery, such as a soft rubber-like sheet, or by a latex-like coating applied by spray or the like. Such coating should be stable and not stain or come off on the car upholstery.

The seat pad is also held in place by suitable tension means engaging under the car seat and extending from side to side, such as the straps 76 sewed under the strong, generally triangular, fabric pieces 76a. These pieces of cloth are in turn sewed to the under surfaces of the seat mat 41 inward from its ends, as shown. The free ends of these straps carry suitable adjustable securing means such as the members 78, which comprise any suitable or desired form of buckle as indicated by 78a. Members 78 also include integral hooks which are adjustable along the straps. These hooks engage under the under-seat and frame members to tension and hold the mat 41 in place. They also hold its front portion 41a stretched over the curved seat cushion front. These hook members 78 may be of chromed metal or of a suitable decorative plastic.

The seat mat 41 and the back mats 44 and 45 are foldably connected by an enlarged, air conducting, flexible, swingable connection. This structure is here formed by the lower ends of the upright back springs being looped over (or hooked to) a laterally extending seat spring 62 which is several springs forward from the larger diameter rear spring 62a. This spring 62a is from three-quarters to one and one-half inches in diameter, and hence much larger than the one-quarter inch coil diameters of the pad springs. It is connected to them as they are interconnected (i.e., by being interwoven). The upright back springs are also connected (as by being twisted through) the next spring 62b, which is forward of 62a. Thus the back mats, even when upright, join in to the seat mat at a very acute or shallow angle at their lower ends to give a good fit up into the angle between the seat and back cushions of the automobile and to provide an attractive appearance.

The impervious back extends loosely (for bending and air flow space) around this larger spring 62a and may have a seam 66 covered with tape 59a. Flexible connections such as stitches 63 hold the backing cover 65 across this connection, and flexible connecting means such as stitches 64 hold the cover cloth 74 in to the sharp, shallow angle corner for a better appearance. A non-collapsing air carrying and flexible connection arrangement is thus provided, with its enlarged rear end spaced rearwardly from its swingable connection to the back mats. It can be readily shoved as far as desired into the junction between the back and seat cushions, to have its enlarged end gripped and held in place by the springiness of the cushions.

The back portions may be held up in place in either a solid back or a divided back by elastic straps, substantially as disclosed in our said co-pending application, or by stronger non-elastic straps 78 and shorter straps 79 with two suitable flat buckles 84 thereon, as shown. These straps are securely sewed to the backing layers inward from the side edges, as shown.

The other sewing and structure of the seat and back mats (including seams, edge tapes, etc.) may be as disclosed in our said co-pending application. This includes the desired values of the porosity of the preferable coarse or open weave cover 74. If desired, a layer of open sponge material may be employed, as previously disclosed.

Forced air is supplied to the seat mat 41 by a flexible flat duct or extension 80 extending downwardly from the front edge in a suitable location, as described herein or in our copending application. As disclosed here, the duct embodies improvements over the disclosures of our said previous application. They include:

(1) The provision of porous front cover areas in the duct cover for air discharge.

(2) The elimination of a seam and hinge structure along the top of the flexible duct.

(3) The use of coil springs in the duct which are a continuation of (and parallel to) the springs in the seat mat, but which are of increasing diameter.

(4) The constant periphery of the two-way tapered lower end of the duct to fit at selected adjusted heights over the corresponding constant periphery of the blower unit.

Here the duct 80 may be shorter if the extension 41a is used. While duct 80 may have a wholly impervious flexible envelope or cover, yet we here prefer that at least the upper portion of its front cover 83 be porous for air discharge like the porous cover 74. Its back cover 84 is impervious like 65.

The whole front cover 83 may be of the same porous material (if desired, of the same piece of cloth extended) as top cover 74, with the front edge seam 71 and tape 72 omitted across the top of the duct for a better appearance and smoother fit.

Lower portions of porous cover 83 may be treated underneath (as by latex) to block off air flow, as indicated by the lines at 78. If a layer of open or porous sponge material is used over the springs in seat mat 41, it may be carried down in all or part of the length of duct 80.

As shown, the front edge seam 71 and tapes 72 of mat 41 may be extended as at 88 down in smooth curves along the side edges of duct 80 to connect its upper and under cover portions. The lower ends of seams 88 are nearly upright to match the sides of casing 12.

The progressively increasing thickness of duct 80 toward its lower end 85 may be flexibly maintained by various wire or coil arrangements. It is here preferred that 80 enclose additional rows of coil springs 91 which are parallel to, and connected (as by intertwisting) with each other and with the seat mat springs 51.

These rows of springs 91 may be formed in various ways. For example, as illustrated, a continuous length of a spring 91 of progressively increasing coil diameter may be bent over a cord 93 at the end of each row. These edge cords 93 may be sewed directly or interwoven with a second cord 93a into the side edge seams 71, 72, substantially as disclosed for the edges of mat 41.

Alternatively, springs 91 (of increasing diameters) may have their extended wire ends looped or hooked to connect to the double sets of cords 93 and 93a, as disclosed for the edges of pad 40.

In order to give its faired-in decrease in thickness adjacent the edges of duct 80 and also to permit changes in shape of its lower end when adjusted along unit 12, the coils should have their effective diameters reduced adjacent each side edge.

This arrangement of springs across 80 can bend more readily to better fit different shapes and sizes of seat cushion fronts.

As shown, springs 91 do not extend to the bottom of duct 80, whose lower portion 85 is thus open for variable lengths of telescopic engagement over part or approximately all of the height of casing 12, which is of constant periphery. The lower portion 85 of flexible (and slightly stretchable) duct 80 is also of constant periphery along its length to match and neatly fit over casing 12 in different vertical adjusted positions, where it is stretched and held by friction.

If desired, additional engaging or clamping means may be provided at the lower end of 80, as by the clamp wire 87 in seam 86. The outward turned ends of wire 87 extend out through open ends of seam 86 and may carry loops 90 through which extend the take-up bolt 87b and nut 87c. Bolt 87b also carries the short spring 4 and hook 3 as previously described. It will be seen that the constant-periphery, lower end 85 of the duct cooperates with the constant periphery of the casing 12 to give the desired telescopic adjustment.

In addition, due to the stretchability of portion 85 of the duct and to the compact and not far from spherical shape of the casing 12, the lower edge seam 86 of 80 may be tilted as shown at 86, to thus take up extra material of the back cover 84 when 12 is tilted.

It will also be understood that the open lower end 85 of the flexible duct may be lightly inflated by the low air pressure.

In this first embodiment of FIGURES 1 to 6, the duct 80 is shown as located to position the blower unit 10 between (but well back of) the driver's feet.

In packaging this first embodiment, shown in FIGURES 1 to 6 (and similarly for the full seat width, second and third forms hereof), the flexible but non-hinged seat mat 41 is bent around the largest possible radius of curvature by first folding in the hinged back mats, then folding the duct 80 over the mat 45, and then folding the seat portion 41 to enclose 44, 45, and 80. The small blower unit 10 is short enough to be included in a suitably shaped box with the whole pad unit.

In the second embodiment of FIGURE 9, the structure may be the same as that of the first form, except as noted, and the same reference numbers, increased by one hundred, are used.

Here back portions 144 and 145 are shown as divided centrally of the seat back. The duct 180 is positioned to locate blower unit 112 just to the left of the transmission hump and just to the right of the driver's right foot. The porous cloth upper cover 174 for the continuous seat mat 141 extends down as far as may be desired over the front of the seat cushion, as shown at 141a, and may conceal the duct 180 and even part or all of blower unit 110. The lower front seam is thus, as shown, at 171a. A suitable strap 143 may be sewed on behind and inward from the lower edge of extension 141a. At its free ends this strap 143 adjustably carries combined buckle and hook units 146 (which may be similar to the above-disclosed suitable seat structure engaging means such as the combined hook and buckle units 78). These hook units 146 may be engaged behind the seat front corner legs or supports to tightly hold front cover 141a in place and to also hold blower unit 110 in place. Cover 141a may be porous all over or in suitable areas to cooperate with the above-disclosed porous upper cover for duct 180. The seat portion 141 is also secured by the straps 176 moved further toward its rear.

As shown in this second form, the seat portion 141 may be frameless as above disclosed, but the separate back portions 144 and 145 may each have frames 155. The frames may be formed of one-eighth inch diameter steel wire which is resilient in normal use, but is manually bendable to fit different shapes of back cushions. These similar frames 155 may be of inverted U form, or generally rectangular with open bottoms having loops 156 at their rearwardly bend and bottom free ends. These loops 156 are engaged over the hinge spring 162 of the seat mat 141. As shown, there are a plurality of seat mat springs behind 162, and the rearmost spring 162a is enlarged, being from three to six times the diameter of the seat mat springs, so that it may be engaged by the seat and back cushions. The upper and lower covers are secured as in the first embodiment hereof. The blower unit 110 may be suitably secured to the strap 143, as by having the strap threaded through a loop forming member on the blower casing front, or by having a loop 143c on the strap to embrace and hold unit 110. The casing is thus retained in operative position.

In the third form, shown in FIGURES 10 and 11, the reference characters are generally the same as for the first form, but increased by 200. The structure is the some as in the first form, except as noted.

As shown in this form, the back portion 244 may be undivided or continuous across the width of the back cushion. It thus needs only the two long straps 276d and 276e, and only the one adjustable securing means such as the buckle 278d.

The sides of the cover 374 (or separate cloth, or sheet plastic pieces sewed under the end seams 269) may be extended down as shown at 272 over the ends or sides of the seat cushion and have the long and short straps 276a and 276b sewed to their under portions. As shown, hooks may be omitted and the larger strap threaded under most front seats behind their front corner legs, and engaged with and tensioned by a suitable buckle 278a on the end of the shorter strap.

As also indicated in the view of FIGURE 11, the flexible duct 280 may have its entire height (or only its lower portion) covered by a second outer cloth or plastic layer 280c. This duct cover 280c may be, as shown, a downward extension of the cover 274 of the seat portion 241 and may extend over and hide the front seam 271. If desired, the front seam 271 may be on top. This cover may be of a length to hide substantially all the height of blower unit 210 when used on a low seat. The sides of this duct-shaped cover 280c may be inwardly turned as shown at 280d to hide the sides of the duct 280 and blower unit 210, and may be held in this position as by a bendable wire 285c in lower seam 285d. As shown, the front seams 271 curve down along and into each of the sides of cover 280c. With a cover such as 280c, the substantially hidden duct 280 and blower unit 210 need not be styled or of attractive finish.

As shown in this third embodiment, the frameless back mat 244 may be swingably or foldably connected to the frameless seat mat 241 by having the lower ends of the upright back springs 252 connected to a plurality of the rearmost of the laterally extending row of connected seat springs 251, of which the rearmost spring 262a is from about three to six times the diameter of the pad springs. As shown, the lower ends of springs 251 are hooked over 262a and springs 251 are also threaded through the next two springs in the seat mat 241 in a double layer. The upper and lower covers are secured as disclosed in FIGURES 1 to 6 above. This arrangement provides an enlarged air carrying connection to be engaged between the seat and back cushions. The front connection of mats 241 and 244 is always at an acute angle.

FIGURES 12 to 14, inclusive, illustrate other modifications in a fourth embodiment of this invention. Here the reference characters are the same as for the first form, but increased by 300. The structure, except as noted, may be the same as in the previously described forms.

As shown here, the entire pad 340 may be of a narrower or one-third width for use by only one person. Since this smaller pad is harder to hold flat and in position, resilient but manually deformable frames such as 354 and 355 are used for the seat portion 341 and the hinged back portion 344, respectively. Seat frame 354 is one piece of about one-eighth inch wire, generally rectangular in shape, and welded. It has a cross bar 354b of the same kind of wire welded in forward of its rear end, to be enclosed in the hinge spring 382 spaced forward from its rear. The rear frame is enclosed in the enlarged rear spring 362a. This arrangement is otherwise similar to the hinge structure disclosed in our said co-pending application.

The back mat frame may comprise a horizontal top wire 355b with end loops 355c. Through these loops are the side frame wires 355d whose enlarged or bent-over lower ends 355e extend through loops 354c formed on the ends of hinge cross wire 354b.

The upper ends of side wires 355d may extend out through reinforced holes in the edge binding and then bend over into hooks which are bendable to engage and fit over the tops of different thickness and shapes of seat backs. The hook and side frame members 355d can be rotated or swiveled in their loop mountings so that they can be folded flat against and overlying the back portion 345 in the packaged arrangement.

The springs, covers, seams, rear hinge, and other features of the seat and back mats 341 and 342 may otherwise be the same as disclosed for the first form of our said copending application.

The upper end of the flexible duct 380 may extend entirely across the front of mat 341 as shown, and may use a continuation of the seat cover 374 as its porous upper surface. The lower end 385 of duct 380 may have a blower unit covering extension 380d which is secured to the duct 380 at about the level 391c that the internal springs 391 end. These springs may be formed and secured as disclosed in FIGURES 1 to 6 hereof, except that the duct side seams 371 and their tapes 372 are sewed through to manually bendable side frame wires 371b engaging the spring ends instead of the side cords of FIGURES 1 to 6 hereof.

The lower end of extension 380d may be curved around to cover the sides of blower unit 310, and may be held by a bendable frame wire 386a in its lower seam 386. This extension 380d of the cover 374 has a length which will bring it just above the car floor for low seats. The hidden lower end 385 of the duct may have a clamp wire similar to that disclosed in FIGURES 1 to 6 above.

As shown in this fourth form, the blower unit casing 312 may be a simple short upright cylinder of metal or plastic, having a uniform diameter, and having its lower end flared-out, if desired, as at 319. The structure and arrangement of the fan 324, the motor 326, the motor-holding cup member 326d with its vanes 326a, 326b, and 326c, and the other features thereof, may be the same as shown in FIGURES 1 to 6 above, but with parts shaped to match the cylindrical shape of the casing 312. Since the blower unit 310 is substantially hidden, it need not be styled or of decorative finish.

In this fourth form of FIGURES 12 to 14, as in the other three embodiments, the pad portion (including its air discharging surface and its spring wire maintained thickness) may be considered as extending down over the nose or front of the car seat cushion to, or below, the height normally engaged by the backs of the user's legs. In FIGURE 12, the slightly tapering inward portion at the top of the duct 380 may also be considered as a very slightly narrower extension of the mat 341.

This feature of a continuous or uninterrupted extension of the seat pad down over the front curve of the seat is important, for devices so made will fit a wide variety of shapes and sizes of seat cushions.

Several features cooperate to provide a neat fit for various seats. They include:

The front-to-back or seat width adjustment obtained by shoving the enlarged rear air carrying flexible member (such as 62a of FIGURE 3) farther into the crevice between the automobile seat and back cushions. Note that 362a and its overlapping seat and back portions can also be so adjusted.

The telescopic adjustment of the lower end of the flexible duct along the full length of casing 12, as well as the ability of the seat mat (such as 41) to fit well on a wide variety of different widths of seats, with its lower front edge 71 extending down to different levels.

The provision for having this whole extension tightly pulled in and fitted as by the tension across the seat width from side straps 76, their adjustable hooks, and their stress distributing members 76a (which are preferably in tension across the bias of the cloth).

The high flexibility of the thin and frameless seat mat also cooperates in a practical and seat-cover type fit for a wide variety of sizes and shapes of seats.

*Operation, preferred values for the air flow system, and other features*

The operation, use, installation, and certain other features for the several forms disclosed in this application are, in general, like those of the similar description in our said co-pending application, which is referred to here in order to avoid needless repetition.

As stated in our said earlier application, it is to be understood that, within the broader aspects of this invention, the blower may also be of the centrifugal or semi-centrifugal type. In any case, it is preferably, but not necessarily, of the inherently quiet, high pressure or high pitch type having large area blades of an efficient air foil shape.

Attention is directed to the particular ranges of values for the fan and air flow systems as set forth in the similar section of our said earlier application.

In the following more detailed disclosure, the features, constants, and values for the blowers, air flow systems, and related matters are covered first. The latter part of this section covers other special features.

A three-bladed fan (24) is illustrated here to show a somewhat shorter corresponding straight-sided (that is, cylindrical) portion for the casing 12, as shown in the first three embodiments hereof. From the standpoint of fan efficiency alone, and for the illustrated specific size, pitch, and outer and hub diameters, only two blades are preferred. To avoid the noise from the siren effect, it is also preferred that there be an even-odd relationship or difference of one in the number of the fan blades and the number of the adjacent swirl-eliminating guides and vanes (such as 26a, 26b, and 26c). In the present drawings, the three guide vanes (with a three-bladed fan) are shown only to indicate the more stable or three-point support in this motor-holding spider in the cup portion 26d.

It will be understood that for a given pitch of the fan blades (to be selected for a particular motor and a particular flow system characteristic from the present teachings), the length of the blades along the motor axis will be shorter if there are fewer blades. In general, for the sizes and system types for the presently disclosed specific automobile forms and where propeller type fans are used, the fans should have from two to four blades.

The very compact or minimum size arrangement illustrated herein can be used for other sizes of motor or fan, and can be suitably modified for different applications under this invention. This arrangement includes the casing (such as 12), the motor, its mounting, and the axial flow fan (such as 24) with its generally cup-shaped hub over the motor and with its blades lying alongside of and entirely (or partly) within the motor height, all as shown in the two casing forms of FIGURES 1 to 11 and 12 to 14 hereof.

This compact arrangement can be used to advantage with motors which are much larger than the two inches long and one inch diameter size illustrated herein. For example, if a motor of three inch diameter and a length of about two and three-quarters inches (as specifically illustrated in our said co-pending application) is used in the present preferred arrangement, the entire blower unit (10 or 310) may have a diameter of a little over four and one-quarter inches and an over-all height (including legs) of about three and one-half inches. Thus, it can go entirely in under the front seat (and in some cases under the front of the rear seat) of most conventional full size U.S. passenger cars or trucks.

The specific curves and data as shown in FIGURES 7 and 8 are not intended to be limiting. They are intended to bring out certain preferred but specific features of the invention as applied to two different types of design for two different sizes of automobile cushion pad devices under this invention. These two curves are intended to illustrate two typical system characteristics.

As indicated by their legends, FIGURES 7 and 8 show four curves on the same plot in which the abscissa is air flow in c.f.m. and the ordinate values are S.P. (static pressure) in inches of water. The negligibly small velocity pressures may be ignored or omitted throughout this disclosure. Each of FIGURES 7 and 8 refers to a particular motor used with two types of the same size of axial flow fan, and to a particular system characteristic.

In FIGURE 7 the comparisons are made on the basis of the unoccupied pad condition. In this figure, curve S1 is for the preferred high pitch and unstable type of axial flow fan of three and one-quarter inches outer diameter and one and one-quarter inches diameter for the outside of the hub or inner ends of the blades, used with a particular series-wound motor (whose performance affects the curve) of about ten watts input rating.

The particular fan used has a pitch of over 20 degrees. For a conservative rating the motor referred to has excess power, since, with approximately 50% fan efficiency and approximately 50% motor efficiency, the maximum or occupied required input power for a new and correctly made device is less than six watts, since the 100% efficient power required to move the air is less than 1.5 watts.

The fan is used in a particular flow system, and the curve shows a preferred system characteristic which includes all air flow restrictions. Here the fan and motor are illustrated at a speed of 6200 r.p.m. for the unoccupied flow of 75 c.f.m., with total system pressure drop or S.P. of 0.125 inch of water.

As shown, the fully occupied S.P. is 0.185 inch of water. Here slightly more than two-thirds of the open or discharge area of porous cover 74 on the pad was shut off by human bodies to raise the pad passage resistance alone by three to one, or from 0.03 inch to over 0.09 inch of water S.P. along this system curve, while the pressure drop through the fixed resistance went down due to the lowered flow volume, for a resulting 0.09 inch of water S.P. therein.

In this typical case of FIGURE 7, the fixed resistance (which may be all or mostly in the blower unit and in duct 80) gives a pressure drop of 0.095 inch of water for a flow of 75 c.f.m. on this S1 curve, so the fixed resistance is over three times the minimum variable resistance. Here also, the maximum or fully occupied pressure is safely below, and about 82% of, the peak stall pressure. The noisy stall point occurs here at about 0.225 inch of water (with a flow of about 54 c.f.m.). It will also be noted that the change in flow or c.f.m. from the fully occupied to the unoccupied condition is from 60 to 75 c.f.m., or an increase of only 15 c.f.m. Stated another way, this is a drop of only 20% from the maximum flow.

Curve F1 shows the varying flow and pressure values for the same fan and the same motor alone at a constant 6200 r.p.m. speed. This 6200 r.p.m. is here shown as the fan speed at the unoccupied pressure on curve S1.

Curve S2 of FIGURE 7 is for a typical higher speed and low pitch (less than 15 degrees) axial flow fan of the inherently or always stable type, which has the same dimensions or outer and inner and blade diameters as the fan used for curve S1. Curve S2 uses the same motor and shows the same flow system as curve S1. This lower pitch stable fan for S2 has a higher speed of 6200 r.p.m. at the unoccupied pressure of 0.125 inch of water, at which point (as shown by the curve) the 75 c.f.m. flow is the same as for the high pitch fan of curve S1.

It will also be noted that curve S2 (for a low pitch fan in the same system) has a lower slope and hence an undesirably greater change in flow for a given pressure change than the change shown in curve S1. Here, the fully occupied flow would be only 40 c.f.m. (as compared to 60 c.f.m. in curve S1). The change from occupied to unoccupied condition is 35 c.f.m. or over 46% of the maximum flow. Thus the low pitch fan has a lower capacity, and its higher speed gives rise to much more noise. It can, however, be used within the broader scope of this invention.

It will further be seen from these curves that a low pitch fan system should also have a suitably large value of fixed resistance (relative to the minimum pad passage or variable resistance), as disclosed above, to prevent too great a relative change or increase in flow from the occupied to the unoccupied condition.

Curve F2 of FIGURE 7 shows the varying flow and pressure values for the same fan and the same motor alone at a constant 8200 r.p.m., which is the same as the unoccupied pressure on curves S1 and S2.

In general, FIGURE 7 relates to a preferred flow system for a complete three-passenger seat and back pad device similar to those illustrated in the first three embodiments hereof. Note that there is provision for air discharge from the pad extension down over the nose or upper front of the cushion and from the porous front of duct 80 of the like. The fans described have a slightly larger outside diameter and capacity than the fan shown in FIGURES 1 to 6.

In FIGURE 8, the four curves are labeled in the same fashion, and are generally the same as those of FIGURE 7. Hence they are not described again in full detail. They are intended to illustrate a system and specific values for a minimum size and minimum or competitive cost pad and flow system with its motor-fan unit designed for a normal occupied or maximum original design flow of only 8.5 c.f.m. This small flow could be used for a one-passenger pad (like that of FIGURES 12 to 14 and having a porous area of only about four to five square feet). In this smaller pad device there is no provision for excess initial or temporary air flow. Only close to minimum flow for steady use is provided here.

In FIGURE 8 the several curves are drawn to make the comparisons on the basis of the occupied or normal maximum pressure of 0.125 inch of water and the corresponding flow values. The S.P. drop for the occupied pad here is for the fully occupied flow volume. The larger unoccupied flow rates are 11 c.f.m. for the preferred high pitch fan system of S1 and 12.5 c.f.m. for the low pitch fan system of S2.

Again in this FIGURE 8, the smaller size and lower cost, series-wound, D.C. motor has an input rating of only about 2 watts. It will have a lower efficiency and so will the smaller and higher speed fan, whether it is of the unstable, high pitch type or of the stable low pitch type. The required theoretical (or 100% efficiency) power to move the air is less than 0.15 watts. Considerably more is made available because of the lower fan and motor efficiencies plus the normal allowance for various service factors, including the gradual increase of resistance from the collection of dirt in the system, particularly in the porous cover 374. In such small motors the available size and costs do not go down appreciably for such small differences in rating.

In FIGURE 8, the curve S1 (for the preferred high pitch fan) has a 7000 r.p.m. value at the normal maximum or occupied pressure, while the low pitch fan of curve S2 has a speed of 9000 r.p.m. at this same pressure. Curve S1 has the peak of its break or unstable hooked portion at 5600 r.p.m., while the low pitch fan of stable curve S2 has a corresponding speed of 7100 r.p.m. at this point on the curve.

It will also be noted in FIGURE 8 that the somewhat less open porous cover 374 is shown as having a restriction of 0.015 inch of water for the occupied flow of 8.5 c.f.m. or 1.7 c.f.m. per square foot.

It may be noted that curve S1 of FIGURE 8 the occupied pressure is approximately 84% of the stall peak. Here in both curves S1 and S2 the ratio of the fixed resistance to the minimum variable resistance is slightly less than five to one. Other comparisons made with respect to FIGURE 7 will be obvious for the several curves in FIGURE 8.

Referring again to both FIGURES 7 and 8, it is known to those skilled in this art, and is noted but not specifically illustrated here, that the peaks for the fan static efficiencies (and also the peaks for the system total efficiencies) for both curves S1 are at static pressures just below their stall points or below, but much closer to, the peaks of the stable portions of the preferred S1 curves than to their zero pressure values. In curves S2 the efficiencies peak at flow values close to those for curves S1.

The efficiencies drop away sharply on either side of the optimum or peak efficiency value. This is true both for high pitch unstable fans and systems, and for low pitch stable fans and systems. Thus it is desirable for both high pitch as well as low pitch fan systems to have the normal maximum operating pressure chosen so that the corresponding flow value falls under or close to the peak of the efficiency curve for the particular system use. Similarly, the unoccupied flow value should be close to the occupied flow value and also close to the peak efficiency.

We have discovered that these desirable results and other practical benefits, including small size, low cost, and efficient, quiet operation, may be realized to better advantage if the preferred ranges or values given herein are used. In both high and low pitch fan systems, under this invention, the preferred ratio of the above-referred-to fixed resistance to the minimum value of the variable resistance (that is, the substantially linear and variable resistance of the pad 40 alone) should be between three to one and five to one. This tends to locate both occupied and unoccupied flow values close to the peak efficiencies, and gives other benefits, as noted.

In the case of unstable fan systems, the preferred system values for this invention may also be characterized by a narrower range of preferred values for the maximum design pressure in terms of a percentage of the stall pressure. From the standpoint of system efficiency (and also from the standpoint of motor and fan size and cost), it is desirable to have the maximum service or fully occupied original design pressure (as well as the lower unoccupied pressure) close to but safely below, the stall or noise point. However, proper allowances must be made for increases in the maximum restriction in use over a long period. These may include obstruction by small amounts of dirt collecting at various points, and mainly in porous cover 74. Also, allowance must be made for manufacturing errors and the various things the customer may do.

Taking account of these various factors, we have found that the original design pressure for the fully occupied (as by large people) condition should be between 50% and 85% of the stall peak pressure (that is, the maximum quiet or operating pressure) in the case of a high pitch or unstable type blower used according to the preferred teachings of this invention.

As will be apparent from curve S2 in both FIGURE 7 and FIGURE 8, it is similarly desirable to have the stable fan system values chosen so that the flow for the occupied pressure falls close to the peak efficiency. This also applies to the maximum flow for the unoccupied condition.

The pressure drop due to the preferred pad alone will vary in close to linear relation to the c.f.m. of air flow therethrough. This should be noted in connection with FIGURES 7 and 8 and the operation and design of different types or designs according to this invention.

For example, if a pad device of this general type were built with substantially all of the resistance of pressure drop being in the pad (such as 40), then when approximately two-thirds or more of its surface area is shut off by occupancy, the air velocity and corresponding pressure drop will increase by not quite three to one, since the flow would be less for a higher pressure value along a curve like S1. If the occupied or normal maximum pressure were chosen to be close below the stall point pressure, it will be obvious that such a system would be very sensitive to exact changes in any excess shut-off of area, as by extra large people or packages. It will also be sensitive to changes due to dirt collecting in the porous cover (such as 74), or to any other back pressure increasing factors occurring in use. It could easily be taken beyond the stall or noise pressure in service. In order to provide for these contingencies, the design or original maximum occupied pressure would have to be well down below the pressure value for peak efficiency, and even then it would be somewhat sensitive to clogging or undue increase in restriction.

Thus such a design is included, but is not our most preferred form under this invention. The foregoing illustrates the practical importance of the preferred ranges of system values given herein from a different approach.

Certain of the factors or proportions of our preferred air flow systems may be characterized or defined and limited in other ways.

The slope of the particular system characteristic curve (such as S1 or S2 of FIGURES 7 or 8) should be steep. The change in c.f.m. of flow from occupied to unoccupied pressure conditions should be kept low, but within practical limits. Thus, for automobile pads this change should be between 15% to 30% for the preferred types of blowers.

The stall air flow should be a high percentage of the occupied air flow, or from about 60% to 85% (substantially as set forth for the range of pressures).

In general, this invention relates to devices of this type having flow volumes ranging from about 8 to 100 c.f.m. (from minimum to maximum) for blowers having tip velocities in the general range of from 25 to 100 feet per second and to porous or air distributing and discharge surfaces having preferred restriction values of from about 0.01 to about 0.08 inch of water S.P. for flow rates therethrough of from 4 to 6 c.f.m. per square foot. A porous type of restriction is preferred.

Higher values of this surface restriction are preferred for large area or long pads, while very low values may be used for small pads, or where a more or less equal or even distribution is not important. The preferred maximum system design pressures may range from about two-tenths of an inch for very small pads up to as high as about one-third of an inch of water for flows of from 4 to 6 c.f.m. per square foot.

In general, the blowers used within the broader teachings of this invention may have rotative speeds of from as low as 600 r.p.m. (for slow, large, quiet centrifugal or semi-centrifugal types of fan up to about one foot in diameter, for indoor use in furniture, beds, and the like) up to as high as about 10,000 r.p.m. (for small sizes of fans down to as low as one and three-quarter inches). These smaller and noisier blowers may be used for automobiles and other higher noise level or lower cost applications.

The specific and probably specially built D.C. motors referred to in connection with FIGURES 7 and 8 are given as examples only for their particular applications. As shown in FIGURE 2, the motor holding cup 24b may be secured to the motor 26 by nuts 26g on the extended ends of the conventional motor assembly bolts.

In the preferred and illustrated types of efficiently designed axial flow fans for automobile use, the fan diameters may run from about one and three-quarter inches to about five inches in outside diameter, and in the speed range of from about 2000 r.p.m. to about 10,000 r.p.m.

Preferably these axial flow fans are made approximately as illustrated herein, with a hollow cup type of hub to carry the blades and to surround the motor. Such fans are preferably a one-piece plastic molding with efficient air foil shape blades, all air flow and engaging corners being rounded off. The blades do not quite overlap, to permit easier molding in plastic. However, their area is preferably large, or close to 100% of their projected or disk area.

As noted in our co-pending application, the high pitch type of blade may be defined as having a pitch of over 18 degrees and usually below about 30 degrees. The preferred normal flow rates per square foot in automobile cushion pads is from about 1½ to about 4 c.f.m. for steady use. The multi-speed adjustment is preferably by a variable speed rheostat, as noted in our said co-pending application. Size and cost of motor and blower permitting, the temporary-use maximum air flow (and motor speed) should be up to about three times the steady-use value.

A combined on-off switch and multi-speed control, connected into the live and ground wires 38, is shown at 38a in FIGURE 2. While this control unit may be of any conventional type and be mounted in any convenient location on or off of the present device, yet we prefer the form illustrated in FIGURE 2. Here the control unit with its dial or knob 38c actuates an on-off switch and, progressively, a combined variable motor speed controlling rheostat of conventional form which is in the casing 38a.

This casing 38a carries a conventional cigar lighter plug 38b with suitable added contacts so that in the normal off position of the cigar lighter, the wires 38 are energized. By pushing in as usual, the plug 38b is heated and the blower is temporarily off while the cigar lighter is removed for its normal use. This permits a convenient and desirable instrument panel mounting of the air flow rate control, with no installation work or problems. The name, trademark, and the like, relating to this device, can also be displayed on this unit 38a and its knob 38c. The wires 38 may easily be shoved under the automobile floor mat (without removing it). These wires may desirably include a suitable length of built-in contractile spring coil, as shown at 38d, to keep the extra length or loop of wire (necessary for the cigar lighter use) coiled up out of the way close to and below (or preferably hooked in behind) the instrument panel.

The areas of the blower casing discharge throughout and at its upper end, and the cross-sectional areas of the duct 80 (particularly the small constant cross-sectional area of its lower end which is adapted to fit on casing 12 for full length telescopic adjustment for different height seats) may preferably supply all or a substantial part of the above-referred to and preferred fixed resistance. These areas should thus be selected and flow tested to give the desired values of this fixed resistance.

It has been found that the effective or substantially open passage thickness (as in the pad 40) may be very greatly reduced without any very appreciable or harmful increase in the maximum air flow resistance of the pad. The one-quarter inch coil value for the diameter of the springs or the effective passage thickness as disclosed here has given good results in the three-passenger seats with backs. Thicknesses down to one-eighth of an inch may be used, especially for smaller (one-passenger) or lower cost devices. Also, this thickness (or this coil diameter) may be lowered to the lowest size if it is desired to arrange or proportion the entire air flow system for a higher (passenger varied) back pressure for the pad. This, of course, would require a correspondingly higher fixed resistance and a higher pressure output. A higher capacity fan will be needed, and the motor will have a higher current consumption and be of greater rating.

Under this invention, for use on automobile seat cushions, we have found it best to use one layer of wire supports or springs having a thickness of more than one-eighth of an inch and less than one-half an inch.

The thinner air carrying and distributing passage defined by springs of one-quarter inch diameter or less will, of course, result in a proportionally increased air velocity in this passage and correspondingly less of a plenum chamber effect. This higher velocity will, for example, tend to discharge more air from the rear or far end of the seat mat such as 41, or even from the upper ends of the back portions, unless the flow distribution is suitably controlled.

It may be noted that, with its suitable front extension (such as 41a making the seat mat from four to ten inches deeper from front to back than in our said co-pending application, and with its porous duct front, a three-passenger or full seat width pad according to this invention may have its discharge area increased by from about two to four feet square. The areas of the one-passenger unit will be increased in similar fashion. Thus a larger capacity blower is recommended for these preferred forms.

Not only is the much thinner pad with the smaller thickness steel wire supports or coil springs much more flexible, but there is, in addition, a material reduction in the required cross-sectional area or gauge of the support or coil wires.

For example, a one-quarter inch diameter spring of the same wire would have four times the stiffness (or resistance to collapse under weight) as a one-half inch diameter coil. The wire thickness can be reduced by approximately the ratio of the square of the coil diameter. Thus the weight and cost of the wire or the spring steel is much reduced. Also, the obstruction or resistance to air flow by the wires is reduced more than proportionately to the decrease in the cross-sectional area of the passage, particularly since the pitch (or space between turns) may be increased in the smaller diameter helices. It need not be one-quarter inch for one-quarter inch diameter springs.

Another important preferred feature of this invention resides in the integrating or uniting of the steel with the cloth or flexible portions of the structure. This is in contrast to the disclosure of our said co-pending application in which the separate and heavier steel wire framed mats of coil springs were loose in, or unconnected to, their enveloping covers. The loose cloth cover 74 (and the loose cloth or plastic bottom 65) could slide or rub over the spring surface to cause wear and a less desirable feel and appearance.

Here, under the present invention, the steel wires and the covers, as well as their edge seams, are united by any suitable flexible means. The stitches or through cords (such as 72a and 72b) may be used for this purpose and situably spaced over the upper and lower pad surfaces. While these stitches or cords may only connect each cover layer to the springs, yet it is preferred that they extend through from side to side.

Flexible means such as the cord or cords 54 and 54a of FIGURE 6A help in this uniting. It is intended that a similar edge securing be used in the other embodiments.

Thus the steel and the soft or fabric portions are united in a common body with the mat of coil springs held against shortening (by sliding into or past each other) by these flexible side seam connections.

Attention is also directed to the desirable feature of always maintaining a tight contact at the pad's exposed seat-to-back joint, as shown by 62d in FIGURES 1 and 3, 162d of FIGURE 9A, 262d of FIGURE 10A, and 362d of FIGURE 14. Here the porous top cover (such as 74) is tightly held in by suitable flexible means which may be the long stitches or cords such as 62b, 162b, 262b, or 362b. Similar flexible means such as the long stitches or cords hold the seat and back impervious backing into the narrowed portions (as shown in different forms by 62c, 162c, 262c, or 362c, all of which go through from side to side).

It is important that the flexible, steel wire mats for the back and seat portions overlap for an appreciable distance (here shown as two or more coil diameters and in varying arrangements) to provide a swingable or foldable connection. This is not a true hinge. It provides a larger cross-sectional area to help carry the air around this corner in cooperation with the rear enlargement (as shown by coil spring 62a, 162a, 262a, or 362a, in their several arrangements). This rear enlargement also supplies (with the springy back and seat cushions) an adjustment to help fit different widths of seats, and a locking or retaining means to hold the whole pad in operative position.

The location of the duct and blower units between the driver's legs is preferred in the several forms here.

The folding of the continuous seat mat about the backs and the duct for packaging, and the fact that the very short unit 10 can go into the same box or carton (since it is of approximately the same height as the loosely folded pad thickness) are also useful.

While the porous and flow distributing layer is sometimes disclosed herein as being the uppermost or top layer, it will be understood that this porous and air distributing layer may be an upper layer which is not necessarily the uppermost or top surface. For example, it may be covered by an extra layer such as 141a or 371b.

Even though this invention in its several embodiments has been specifically disclosed for use with mats or pads to go on cushions and for automobile use, it will be understood that the several features and aspects hereof may be used in various other applications or forms. These may, for example, include the supplying of air into a conventional but suitably inclosed and porous cloth-covered spring body of a bed, couch, or chair. Various other uses or ways of combining the several features, or of carrying out the invention, may be employed within the present teachings and the scope of the appended claims.

We claim:

1. A forced air circulating pad device for use on automobile seat cushions comprising, in combination, a flexible, generally rectangular pad having edges and including an upwardly open mat of collapse resisting, pad thickness maintaining, flexibly interconnected members spaced apart to form a substantially open, forced air carrying passage of low flow resistance, said pad also including impervious flexible sheet means to prevent escape of air from the bottom of said pad, said rectangular pad having a front-to-back depth and a flexibility to extend and flexibly bend to fit neatly down over the curved fronts of different sizes and shapes of automobile seat cushions to provide comfort, and to discharge forced air under the user's knees, and means to supply forced air to said pad including a flat, flexible, conduit means having a wide upper end of substantially the same thickness as said pad and connected to the lower front edge thereof along a length adequate for low resistance air flow.

2. A forced air circulating pad device for use on automobile seat cushions comprising, in combination, connected flexible, generally rectangular, seat and back cushion pads having edges and each including an upwardly open mat of collapse resisting, pad thickness maintaining, flexibly interconnected members spaced apart to form a substantially open, forced air carrying passage of low flow resistance, said pads also including impervious flexible sheet means on each pad to prevent escape of air from the bottom of each of said pads, porous flexible sheet means on the upper surfaces of each pad to discharge air, said pads being connected for air flow therebetween, said rectangular seat cushion pad having a front-to-back depth and a flexibility to extend and flexibly bend to fit neatly down over the curved fronts of different sizes and shapes of automobile seat cushions, to provide comfort to, and to discharge air under, the user's knees, said air discharging porous sheet means extending down over said curved front, and means to supply forced air to said pad including a flat, flexible, forced air supplying conduit means including coil springs therein to prevent collapse thereof and having an open lower end and a wide upper end of substantially the same thickness as said seat cushion pad and connected to the lower front edge thereof along a length adequate for low resistance air flow, and a blower unit connected to said open end.

3. A forced air circulating pad device for use on automobile seat cushions comprising, in combination, a generally rectangular, flexible seat cushion pad and a connected, generally rectangular, flexible back cushion pad, each pad having edges and each including an upwardly open mat of collapse resisting, pad thickness maintaining, flexibly interconnected members spaced apart to form a substantially open passage of low flow resistance, and impervious flexible sheet means under each said mat, the thickness of each of said pads being substantially the same as that of said members, said pads being connected along an edge of each for low resistance to forced air flow therebetween, the front of said seat cushion pad including and continuing into an adjacent forced air supplying duct extension portion of generally similar flexible, upwardly open, collapse resistant, and bottom closed construction having a width extending along a substantial length of the front of said seat cushion pad adequate for low air flow resistance, said seat cushion pad, including its said upwardly open extension portion, having a front-to-back depth and a flexibility to flexibly bend and fit down neatly over the curved fronts of different sizes and shapes of said cushions to discharge forced air under said user's knees, said extension portion having a lower open end adjacent the bottom of said cushion to be connected to a forced air supplying blower unit, said extension portion smoothly narrowing and thickening into said low flow resistance open end.

4. A forced air circulating pad device for use on automobile seat cushions comprising, in combination, a generally rectangular, flexible seat cushion pad and a connected, generally rectangular, flexible back cushion pad, each pad having edges and each including an upwardly open mat of collapse resisting, pad thickness maintaining, flexibly interconnected members spaced apart to form a substantially open passage of low flow resistance, and impervious, flexible sheet means under each said mat, the thickness of each of said pads being substantially the same as that of said members, said pads being connected along an edge of each for low resistance forced air flow therebetween, the front of said seat cushion pad including and continuing into an adjacent forced air supplying duct extension portion of generally similar, flexible, upwardly open, collapse resistant and bottom closed construction having a width extending along a substantial length of the front of said seat cushion pad adequate for low air flow resistance, said seat cushion pad, including its said upwardly open extension portion, having a front-to-back depth and a flexibility to flexibly bend under the user's knees and fit down neatly over the curved front of different sizes and shapes of said seat cushions and to discharge forced air under said user's knees, said extension portion having a lower open end adjacent the bottom of said seat cushion and being connected to a forced air supplying blower unit, said pad having a width to extend from side to side of a multi-passenger bench type automobile front seat and an adjustable length flexible strap means connected to each side thereof, through stress distributing, larger area, flexible sheet portions, to extend downwardly, and seat engaging means at the lower end of each said strap means, said strap means holding the said flexible seat cushion pad stretched from side to side over different sizes and shapes of such seat cushions.

5. A forced air circulating pad device for use on automobile seat cushions comprising, in combination, a generally rectangular, flexible seat cushion pad and a connected, generally rectangular, flexible back cushion pad, each pad having edges and each including an upwardly open mat of collapse resisting, pad thickness maintaining, and flexibly interconnected members spaced apart to form a substantially open passage of low flow resistance, and impervious, flexible sheet means under each of said mats, the thickness of each of said pads being substantially the same as that of said members, said pads being connected along an edge of each for low resistance forced air flow therebetween, the front of said seat cushion pad including and continuing into an adjacent forced air supplying duct extension portion of generally similar, flexible, upwardly open, collapse resistant and bottom closed construction having a width extending along a substantial length of the front of said seat cushion pad adequate for low air flow resistance, said seat cushion pad, including its said upwardly open extension portion, having a front-to-back depth and a flexibility to flexibly bend under the user's knees and fit down neatly over the curved fronts of different sizes and shapes of said seat cushions to discharge forced air under said user's knees, said extension portion having a lower open end adjacent the bottom of said seat cushion and being connected to a forced air supplying blower unit, said extension portion smoothly narrowing and thickening into said low flow resistance open end, and a flexible seat front cover extending from the lower front edge of said pad down over said flexible duct means and said blower unit to substantially cover and hide said duct means and said blower unit.

6. A forced air circulating pad device for use on automobile seat cushions comprising, in combination, a generally rectangular, flexible seat cushion pad and a connected, generally rectangular, flexible back cushion pad, each pad having edges and each including an upwardly open mat of collapse resisting, pad thickness maintaining, flexibly interconnected members spaced apart to form a substantially open passage of low flow resistance, and impervious, flexible sheet means under each said mat, the thickness of each of said pads being substantially the same as that of said members, said pads being connected along an edge of each for low resistance forced air flow therebetween, the front of said seat cushion pad including and continuing into an adjacent forced air supplying duct extension portion of generally similar, flexible, upwardly open, collapse resistant and bottom closed construction having a width extending along a substantial length of the front of said seat cushion pad adequate for low air flow resistance, said seat cushion pad, including its said extension portion, having a front-to-back depth and a flexibility to bend flexibly under the user's knees and fit down neatly over the curved fronts of different sizes and shapes of said seat cushions to discharge forced air under said user's knees, said extension portion having a lower open end adjacent the bottom of said seat cushion and being connected to a forced air supplying blower unit, said extension portion smoothly narrowing and thickening into said low flow resistance open end, said pad having a width to extend from side to side of a multi-passenger bench type automobile seat and having at least one back cushion pad portion swingably connected thereto to receive forced air therefrom, flexible sheet portions extending from each side edge of said seat pad down over and at least partially covering the sides of said seat cushion, and seat engaging retaining means connected to the lower ends of said covering portions.

7. A human body supporting and forced air supplying device comprising a layer of flexibly interconnected, collapse resisting members substantially defining the thickness of an air distributing passage and plenum chamber which is upwardly open for forced air flow to a supported human body, said members being spaced apart for low flow resistance therebetween, said layer including means to otherwise imperviously enclose said passage, the flow resistance of said layer being varied by occupancy thereof, means to supply forced air to said passage including a relatively short, low flow resistance connection, a blower and a directly connected electric motor, and resistance means to provide an additional and substantially constant forced air flow restriction of from three to five times the occupied flow resistance of said layer, said resistance means being part of said forced air supplying means.

8. A human body supporting and forced air supplying device comprising a layer of flexibly interconnected, collapse resisting member substantially defining the thickness of an air distributing passage and plenum chamber which is upwardly open for forced air flow to a supported human body, said members being spaced apart for low flow resistance therebetween, said layer including means to otherwise imperviously enclose said passage, the flow resistance of said layer being varied by occupancy thereof, means to supply forced air to said passage including a relatively short, low flow resistance connection, a high air delivery type blower having high pitch blades and being unstable at a certain operating pressure and a directly connected electric motor, and resistance means to provide an additional and substantially constant forced air flow restriction greater than the unoccupied flow resistance of said layer, said resistance means being part of said forced air supplying means and limiting the normally fully occupied pressure of said blower to a pressure which is between 60% and 85% of the said unstable pressure for said blower.

9. A flexible pad device for use on, and to bendably deflect with, the seat and back cushions of automobile seats, comprising a thin, flexible, seat cushion covering pad and a similarly thin, flexible, back cushion covering pad, each having edges and each including an upwardly open layer of collapse resisting, pad thickness defining, flexibly interconnected members spaced apart for low air flow resistance therebetween, each said flexible pad having impervious flexible sheet means to otherwise enclose it against air escape therefrom, means to supply forced air to one of said pads, and means to interconnect edge portions of said pads for low resistance flow of forced air from one to the other, said interconnecting means including securing means connecting edge regions of said pads in substantially open, face-to-face, and overlapping relation outwardly enclosed by said impervious means to form a thicker, air carrying connecting region adapted to be forced into the juncture of the said automobile seat and back cushions when said flexible pads are installed and bent to swing said back cushion pad up against the back cushion, said means to interconnect also providing for the compact packaging of said two connected flexible pads in a flat double layer.

10. A flexible pad device for use on, and to bendably deflect with, the seat and back cushions of automobile seats, comprising a thin, flexible, seat cushion covering pad and a similarly thin, flexible, back cushion covering pad, each having edges and each including an upwardly open layer of collapse resisting, pad thickness defining, flexibly interconnected members spaced apart for low air flow resistance therebetween, flexible sheet means enclosing said two pads and providing air discharge openings only over said upwardly open layers, means to supply forced air to one of said pads, means to interconnect edge portions of said pads for low resistance flow of forced air from one to the other, said interconnecting means including securing means directly connected between said members at edge regions of said two layers to connect said two pads in substantially open, face-to-face, and overlapping relation outwardly enclosed by said flexible sheet means to form an air carrying and thicker connecting adapted to be forced into the juncture of the said automobile seat and back cushions when said flexible pads are installed and bent to swing said back cushion pad up against the back cushion and provide an inner and upper acute dihedral angle between said two pads, and means to hold said flexible sheet means into said acute angle.

11. A flexible pad device for use on, and to bendably deflect with, the seat and back cushions of automobile seats, comprising a thin, flexible, seat cushion covering pad and a similarly thin, flexible, back cushion covering pad, each having edges and each including an upwardly open layer of collapse resisting, pad thickness defining, flexibly interconnected members spaced apart for low air flow resistance therebetween, each said flexible pad having impervious flexible sheet means to otherwise enclose it against air escape therefrom, means to supply forced air to one of said pads, means to interconnect edge portions of said pads for low resistance flow of forced air from one to other, said interconnecting means including securing means connecting edge regions of said pads in substantially open, face-to-face, and overlapping relation outwardly enclosed by said impervious means to form an air carrying and thicker connecting region, and at least one of said layers extending rearwardly beyond said overlapped region and having enlarged thickness means connected to its rear edge and adapted to be resiliently held between the back and seat cushions at their juncture, in different depths of insertion, to help retain said pad device in position.

12. A human body supporting and forced air supplying device comprising a layer of flexibly interconnected, collapse resisting members substantially defining the thickness of an air distributing passage and plenum chamber which is upwardly open for forced air flow to a supported human body, said members being spaced apart for low flow resistance therebetween, said layer including means to otherwise imperviously enclose said passage, the flow resistance of said layer being varied by occupancy thereof, means to supply forced air to said passage including a relatively short, low flow resistance connection and a directly connected electric motor and blower, and resistance means in said connection providing a substantially fixed restriction which is substantially greater than the normal maximum occupancy flow resistance of said upwardly open layer and which limits the reduction in air flow from the unoccupied to the normally fully occupied condition to between 15% and 30% of the unoccupied flow rate.

13. A human body supporting and forced air supplying device comprising a layer of flexibly interconnected, collapse resisting members substantially defining the thickness of an air distributing passage and plenum chamber which is upwardly open for forced air flow to a supported human body, said members being spaced apart for low flow resistance therebetween, said layer including means to otherwise imperviously enclose said passage, the flow resistance of said layer being varied by occupancy thereof, means to supply forced air to said passage including a relatively short, low flow resistance connection and a directly connected electric motor and blower, resistance means in said connection providing a substantially fixed restriction which is substantially greater than the normal maximum occupancy flow resistance of said upwardly open layer and limits the reduction in air flow from the unoccupied to the normally fully occupied condition to between 15% and 30% of the unoccupied flow rate, and porous flexible sheet material over said upwardly open layer having a small porous flow resistance to aid in the distribution of air flow over the entire body supporting surface, said porous flexible sheet having an air flow resistance which varies linearly with air flow velocity and which is in the range of flow resistance defined by a static pressure drop across said porous sheet material of from 0.005 to 0.013 inch of water for an air flow of one cubic foot per square foot of its operative area.

14. A pad device for use on automobile seat cushions comprising a flexible pad including an upwardly open layer of flexibly interconnected, collapse resisting and thickness defining members spaced apart to form a passage of low air flow resistance and impervious flexible sheet means under said layer to prevent escape of air therefrom, duct means to supply forced air to said passage comprising a flexible extension having collapse resisting means and having upper and lower ends, the upper end having a thickness substantially equal to that of said pad and a substantial width communicatingly connected to the front edge of said pad to bendably fit down over the front edge of said seat cushion, said duct extension tapering down into a narrower and thicker lower open end adjacent the bottom of said seat cushion, and a blower unit connected at least partially in said lower open end, said blower unit including an upper, upright axis, small electric motor and a directly connected, integrally molded, cup shaped axial flow fan over the lower end of said motor, having blades at least in part along side of said motor, to provide a compact unit of small height to fit in under the front seat cushions of most passenger automobiles.

15. As an article of manufacture and for use detachably connected into the lower open end of a flexible conduit extending down over the front of an automobile seat cushion from a flexible, forced air distributing pad on said seat cushion; a forced air supplying blower unit whose height is little more than that of its motor, said blower unit comprising an upper, upright axis, small electric motor, a directly connected, integrally molded, cylindrical, cup shaped, axial flow fan unit over the lower end of said motor, said fan unit having integral molded blades on said cup substantially between the top and bottom of said motor for a minimum height of unit, and an upright casing open at top and bottom and comprising at least a lower cylindrical portion about said blades, and means to support said motor in said casing.

16. As an article of manufacture and for use detachably connected into the lower open end of a flexible conduit extending down over the front of an automobile seat cushion from a flexible, forced air distributing pad on said seat cushion; a forced air supplying blower unit whose height is little more than that of its motor, said blower unit comprising an upper, upright axis, small electric motor, a directly connected, integrally molded, cylindrical, cup shaped, axial flow fan unit over the lower end of said motor, said fan unit having integral molded blades on said cup substantially between the top and bottom of said motor for a minimum height of unit, and an upright casing open at top and bottom and having a lower cylindrical portion about said blades and an upper portion, motor holding means in the upper portion of said casing comprising a molded cup to embrace the upper end of said motor and generally radially extending and casing wall engaging vanes shaped to remove swirl from the discharge of said fan.

17. An electrical forced air supplying pad device for easy and detachable installation and use on the front seat cushion of an automobile, comprising an upwardly open, flexible pad including a layer of flexibly connected, collapse resisting members spaced apart for low flow resistance on a leakage preventing flexible sheet means, a flexible duct extension including collapse resisting means extending from a substantial portion of the length of said front edge, down over the front of the automobile seat cushion to an open lower end adjacent the bottom of said cushion, a blower unit connected to said open lower end and including a blower and a connected electric motor, and means to energize and control said electric motor including wire means connected to said motor, a control and connecting unit to fit into an automobile cigarette lighter socket and connected to said wire means, said unit including electrical contacts connected and positioned to energize said blower unit motor only when said control unit is in one position in the automobile's cigarette lighter socket, and said control unit also including other contacts and a cigarette lighter heating coil connected to said other contacts, which are positioned to be energized only in another position in said socket different from said blower motor energizing position, said wire means being long enough to permit withdrawal of said control unit and normal use of the cigarette lighter therein while said blower unit motor is temporarily disconnected.

18. A flexible pad device for use on automobile seat cushions comprising, in combination, a generally rectangular flexible seat cushion pad having edges and including and upwardly open layer of collapse resisting, pad thickness defining, and flexibly interconnected members having thin sheet means to prevent the escape of air from its under surface, said members being spaced apart to form a low air flow resistance passage, and forced air supply means for said pad including a flexible air duct forming an extension of only part of said pad front and being of substantially the same thickness and flexibility as said pad, said duct being upwardly open and including internal collapse resisting means, said duct extension being connected along a substantial length of the front edge of said pad adequate for low flow resistance, said pad and its said upwardly open duct extension having a front-to-back depth and a flexibility to flexibly bend and fit neatly over the curved fronts of different sizes and shapes of said seat cushions under the user's knees, and to discharge forced air under said user's knees, said duct extension having a wholly enclosed lower portion including an open, narrower, and thicker end adjacent the seat cushion bottom to be connected to a blower unit.

19. A flexible pad device for use on, and to bendably deflect with, automobile seat and back cushions, comprising a seat cushion pad and an edge connected back cushion pad, each being flexible, generally rectangular, and upwardly open, and having free edges and an impervious flexible sheet means to otherwise enclose it, each pad including an upwardly open layer of collapse resisting, pad thickness defining, and flexibly interconnected members spaced apart for low resistance to forced air flow therebetween, means, including a thin, wide, flexible and collapse resisting duct connected to a free edge of said seat cushion pad, to supply forced air to said device, said pads being connected for low air flow resistance communication by a region along the connected edge of each pad being secured together in open, face-to-face, and overlapping relation to form a thicker air carrying passage outwardly enclosed in said impervious flexible sheet means, and front edge securing means and rear edge securing means for said seat cushion pad, said front edge securing means being operatively connected to the front edge of said pad, said rear edge securing means including said thicker overlapped region which is adapted to be forced into the juncture of said seat and back cushion for different distances, to be retained thereby and to thus adjust the effective front-to-back depth of said seat cushion pad for different depths of said seat cushions.

20. A flexible pad device for use on, and to bendably deflect with, the seat and back cushions of automobile seats, comprising a thin, flexible, seat cushion covering pad and a similarly thin, flexible, back cushion covering pad, each having edges and each including an upwardly open layer of collapse resisting, pad thickness defining, flexibly interconnected members spaced apart for low air flow resistance therebetween, each said flexible pad having impervious flexible sheet means to otherwise enclose it against air escape therefrom, means to supply forced air to one of said pads, and means to interconnect edge portions of said pads for low resistance flow of forced air from one to the other, said interconnecting means including securing means connecting edge regions of said pads in substantially open, face-to-face, and overlapping relation outwardly enclosed by said impervious means to form a thicker, air carrying, connecting region adapted to be positioned in the juncture of said seat and back cushions when said flexible pads are bent to swing said back cushion pad up against the back cushion, a flexible cover sheet having a lower edge and being porous for forced air flow therethrough over substantially the upwardly open area of said seat cushion pad, said same porous cover sheet extending continuously down to fit over the curved front of said seat cushion to form a seat cushion cover and retaining means to hold said porous cover sheet.

References Cited in the file of this patent

UNITED STATES PATENTS

| | | |
|---|---|---|
| 2,158,801 | Petterson | May 16, 1939 |
| 2,235,966 | Summers | Mar. 25, 1941 |
| 2,512,559 | Williams | June 20, 1950 |
| 2,621,849 | Minnis | Dec. 16, 1952 |
| 2,731,542 | Daniels | Jan. 17, 1956 |
| 2,791,956 | Guest | May 14, 1957 |
| 2,801,681 | Crane | Aug. 6, 1957 |
| 2,804,913 | Pickard | Sept. 3, 1957 |
| 2,818,912 | Odor | Jan. 7, 1958 |

FOREIGN PATENTS

| | | |
|---|---|---|
| 429,326 | France | July 13, 1911 |
| 423,433 | Great Britain | Jan. 28, 1935 |